United States Patent [19]
Murphree

[11] Patent Number: 5,437,086
[45] Date of Patent: Aug. 1, 1995

[54] METHOD OF FABRICATING A BI-METAL PIPE SECTION

[76] Inventor: Pat D. Murphree, 7500 E. County Rd. 110, Midland, Tex. 79701

[21] Appl. No.: 118,271

[22] Filed: Sep. 9, 1993

[51] Int. Cl.$^6$ .............................................. B23P 6/00
[52] U.S. Cl. .................... 29/402.13; 29/401.1;
   29/402.11; 29/402.16; 29/402.19; 228/119;
   138/96 T; 138/97; 138/DIG. 6; 285/15;
   285/390
[58] Field of Search ............ 29/401.1, 402.11, 402.13,
   29/402.16, 402.19; 228/112, 114, 119; 138/96
   R, 96 T, 97, 109, DIG.6; 285/15, 55, 333, 390,
   422; 82/1.11, 110

[56] References Cited

U.S. PATENT DOCUMENTS

| | | | |
|---|---|---|---|
| 2,088,763 | 8/1937 | Sample . | |
| 3,520,561 | 7/1970 | Rininger | 138/109 X |
| 3,606,659 | 9/1971 | Robbins | 138/109 X |
| 3,860,039 | 1/1975 | Ells | 138/103 |
| 4,366,971 | 1/1983 | Lula | 285/55 |
| 4,524,996 | 6/1985 | Hunt | 825/55 |
| 4,556,240 | 12/1985 | Yoshida | 285/55 |
| 4,679,294 | 7/1987 | Lomax et al. | 29/460 |
| 4,883,292 | 9/1989 | Kuroki | 285/55 |
| 4,949,895 | 8/1990 | Sugiyama et al. | 285/55 |
| 5,069,485 | 12/1991 | Allen et al. | 285/55 |

Primary Examiner—S. Thomas Hughes
Attorney, Agent, or Firm—Marcus L. Bates

[57] ABSTRACT

A method of making a bi-metal pipe section, and especially reclaiming a used or damaged pipe section by making it into a bi-metal pipe section which resists corrosion. The bi-metal pipe section is used in constructing a pipe line or production tubing that resists corrosion at the pipe coupling where corrosion is especially prevalent in fluid conduits. The bi-metal pipe section is fabricated by first removing an annular marginal end of a length of the pipe section of the prior art, to provide a long length of pipe having a partially threaded cut end opposed to an opposite end. Next, an annular short length of pipe is axially aligned and butt welded to the cut, end of the long length of pipe. The short length of pipe preferably is an annular metallic alloy having greater resistance to corrosion respective to the long length of pipe. Next, the pipe section is placed in a turning lathe and threads are formed on the marginal end of the bi-metallic pipe, with the threads extending along the marginal cut end and along the short end of the bi-metallic pipe. The pipe section therefore has some of the original threads left at the opposed marginal ends thereof and therefore the new threads formed on the short end of the bi-metallic pipe must be a continuation of the old threads found on opposed ends of the first recited length of pipe.

14 Claims, 1 Drawing Sheet

METHOD OF FABRICATING A BI-METAL PIPE SECTION

BACKGROUND OF THE INVENTION

The prior art contains several examples of corrosion resistant pipe having an ordinary carbon steel medial length integrally connected to opposed corrosion resistant alloy steel end members, thereby providing a bi-metal pipe section, such as seen in the prior patents to SAMPLE, 2,088,763; LOMAX, 4,679,294 and LULA, 4,366,971, for example.

The present invention patentably differs from the prior art and is advantageously used in manufacturing pipe sections that constitute an improvement over the type seen in the prior art references by the provision of an improved pipe section having opposed threaded ends; the marginal opposed threaded ends of which have a limited length thereof replaced with a stainless steel annular member. The stainless steel annular member is axially aligned with respect to the central longitudinal axis of the pipe section, and is made an integral part of the pipe section. The outer surface of the annular member is threaded such that the resultant new threaded surface coincides with and is an uninterrupted continuation of the original threads that remain on and extend along the old part of the pipe section.

This improved corrosion resistant pipe section unexpectedly results in a method of repairing old pipe sections wherein the resultant product is superior to the original pipe section. The new improved pipe section can be set down on the opposed ends thereof without damaging the corrosion resistant features thereof for the reason that the corrosion resistant features are achieved by substituting an annular stainless steel alloy for a short marginal opposed end of the ordinary carbon steel pipe length and therefore there is no need to rely on an internal plastic coating or otherwise sealing the pipe ends in order to isolate the underlying metal from the deleterious effects of corrosive fluid with which it is brought into contact.

SUMMARY OF THE INVENTION

The present invention comprehends a bi-metal pipe section having relatively short, opposed, marginal ends made of a metal that is relatively highly corrosion resistant respective to the longer medial length thereof; the longer medial length being made of a metal that is relatively less corrosion resistant. The bi-metal pipe section has threaded opposed marginal ends that commence at one opposed terminal end of the bi-metal pipe section and continues uninterrupted along the length of the pipe section made from the highly corrosion resistant metal and continues uninterrupted along a marginal length of the pipe section that is made from a relatively less corrosion resistant metal.

The improved pipe section of this invention is made by removing a limited length of the annular marginal threaded end of a new or used pipe section to provide a long length of pipe having a threaded cut end opposed to an opposite end. An annular ring or short length of pipe is axially aligned respective to the cut end of the long length of pipe. The new short length of pipe is made from a material selected from the group consisting of alloys having greater resistance to corrosion respective to the original long length of pipe. The short length of pipe is butt welded onto the cut end of the pipe to provide a bi-metallic pipe section having a common axis. Next, threads are formed on the outer surface of the new annular member that forms the marginal ends of the improved bi-metallic pipe, with the new threads extending uninterrupted along the marginal cut end and matching the old threads that were left on the cut end of the long length of the bi-metallic pipe.

The resultant pipe section therefore has threads formed on opposed marginal ends thereof by removing a marginal length of the threaded end of the pipe section, and forming threads on the new attached short length of the bi-metallic pipe, with the new threads being a continuation of the old threads remaining on the original pipe section.

Where an old pipe section has damaged threads near the outermost end thereof, by the present invention the pipe ends having the damaged threads are removed and replaced with new threads formed on the attached short length of the bi-metallic pipe. Hence where an old pipe section has damaged threads at the outermost end thereof, the material bearing the damaged threads is removed, and the removed part is replaced with new corrosion resistant material on which new threads are subsequently formed, with the new threads being a continuation of the remaining threads.

A primary object of the present invention is the provision of a corrosion resistant pipe section having opposed ends made of corrosion resistant metal that does not rely on plastic coating in order to protect the metal thereof and therefore will not corrode when the plastic coating near the coupling at opposed ends thereof is damaged.

Another object of the invention is to provide an improved corrosion resistant pipe section having relatively short, opposed, marginal ends made of a metal that is relatively highly corrosion resistant respective to the longer medial length thereof; said longer medial length being made of a metal that is relatively less corrosion resistant.

A further object of this invention is to disclose and provide a process wherein the marginal ends of an old pipe section having damaged threads near the outermost end thereof is removed and replaced with new material on which new threads are formed.

A still further object of this invention is to provide a pipe section having a corrosion resistant threaded marginal end formed on opposed marginal ends thereof by removing a limited length of the marginal threaded end of the first recited pipe section, attaching a short length of corrosion resistant material to the remaining threaded end thereof; and then forming threads on the attached short length of the bi-metallic pipe which are a continuation of the threads remaining on the first recited pipe section.

Another and still further object of this invention is the provision of a method of repairing the marginal threaded end of a pipe section and at the same time improve the corrosion resistant properties of the pipe section.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

DETAILED DESCRIPTION OF THE PREFERRED EMBODIMENT

Figure 1:
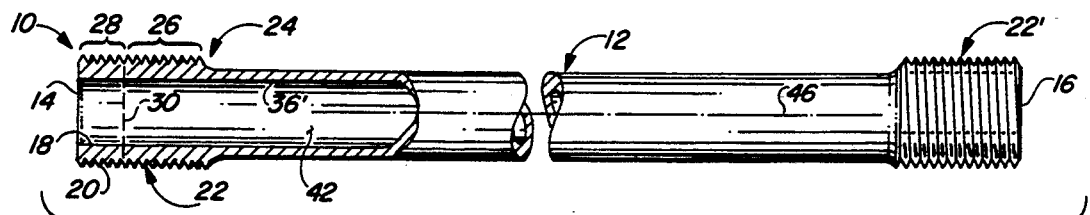
FIG. 1 is a fragmentary, part cross-sectional illustration of a bi-metallic pipe section made in accordance with the present invention.

FIG. 1 of the drawings illustrates a pipe section 10 having a central part or long length of pipe 12 that terminates at opposed ends 14 and 16. The pipe section 10 has an inner surface 18 opposed to an outer surface 20. The outer surface 20 usually is enlarged at opposed ends 14 and 16 thereof, and includes threads 22, 22'. Numeral 24 indicates the reduced diameter part of the enlargement at outer surface 20.

FIGS. 1-7 of the drawings, wherein like or similar numerals refer to like or similar parts, illustrate a novel method of fabricating or rejuvenating a pipe section. As particularly illustrated in FIGS. 2, 3 and 4, numerals 110, 210, and 310 indicate the operational steps required to provide the novel pipe section 310 of FIG. 4, made in accordance with this invention. The novel pipe section 310 generally appears to the casual observer to have the same configuration as pipe section 10 of FIG. 1. However, the pipe section 10 of FIG. 1 could also have the appearance of an old pipe section having damaged threads 22, 22' opposed ends 14, 16 thereof.

Figure 2:
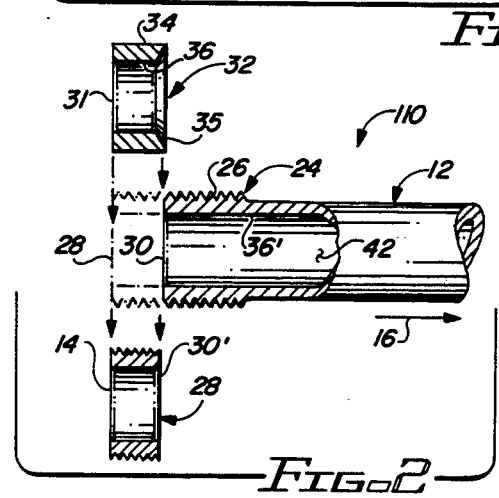
FIG. 2 is a fragmentary, part cross-sectional representation which sets forth an illustration of some of the steps of a novel process by which the improved bi-metallic pipe section of this invention is fabricated.

For purpose of discussion, threaded end 22 of pipe section 10 of FIG. 1 can be designated as having a remaining threaded marginal length 26 and a potentially discarded terminal end 28 upon effecting a perpendicular cut along line 30, which severs the terminal end 28 from the remaining marginal length 26 and long length of pipe 12; ie; the remaining threaded marginal length 26 is located on the long length of pipe 12 of pipe section 10.

in FIG. 2, there is shown an old annular member 30' that has been removed from the pipe section of FIG. 1, for example, and discarded. A new unthreaded ring or annular member 32 is provided having an outer end 31 opposed to an inner end that is of a suitable size to be butt welded to the terminal end 30 of the long length of pipe 12 of pipe section 10. The outer surface 34 of the annular member 32 is preferably unthreaded at this step of the method of the present invention. The opposed end of annular member 32 is chamfered as indicated at 35. The interior 36 of annular member 32 coincides with the interior 36' of the long length of pipe 12 of pipe section 10.

Figure 3:
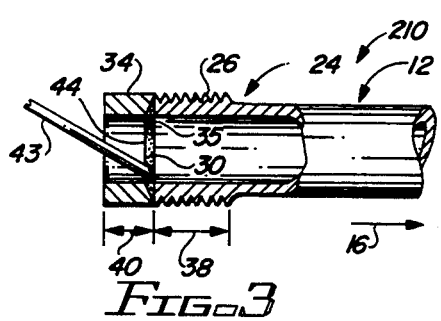
FIG. 3 is a fragmentary, part cross-sectional representation which sets forth additional steps of a novel process by which the improved hi-metallic pipe section of this invention is fabricated.

FIG. 3 illustrates butt welding annular member 32 in axially aligned relationship to end 30 of the long length of pipe 12. Numeral 38 indicates the approximate length of the old or remaining threads of the long length of pipe 12, while numeral 40 indicates the area where new threads are to be formed on outer surface 34 of annular member 32. The butt welding occurs on the interior 42 of the pipe section 210 as noted at 43, wherein the weld bead is formed circumferentially along the welding line 44 on the interior wall surface of the pipe section 210. Other methods of integrally joining the ring or annular member 32 and the long length of pipe 12 can be employed as may be desired.

Figure 4:
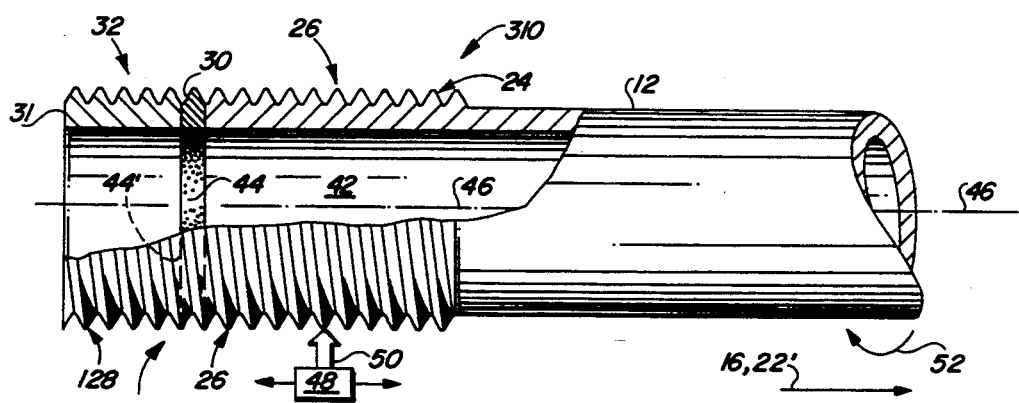
FIG. 4 is an enlarged, fragmentary representation of other novel process steps that are carried out during fabrication of a pipe section made in accordance with the present invention.

FIG. 4 sets forth the preferred embodiment of the present invention, which comprises a bi-metal pipe section 310 having opposed threaded ends, 22 and 22'. At least part 32 of one threaded end 22 is made of a metal that is relatively highly corrosion resistant respective to the long length of pipe 12 thereof. The long length of pipe 12 is made of a metal that is relatively less corrosion resistant respective to the marginal terminal ends 32 defined by member 34. Accordingly, the pipe section 310 has opposed ends, one or both having threads 22, 22', with the threads commencing at the outer end 31 of the bi-metal pipe section 310 and continues up interrupted along the highly corrosion resistant annular member 32, and continues uninterrupted along the threaded marginal length at 26 that is part of the long length of pipe 12 and therefore, relatively less corrosion resistant.

Numeral 46 is the axial centerline of pipe section 310. The new threads 128 are formed by any suitable apparatus 48 having thread cutting device 50 thereon. Numeral 52 indicates relative turning induced between the pipe section 310 and the apparatus 48 and 50, such as may be achieved by use of an engine turning lath, for example.

FIGS. 1-4 also set forth the specific details of the preferred method of fabricating a pipe section 310 in accordance with the preferred embodiment of the invention, and illustrates the various steps 110, 210, and 310 required for fabrication of the hi-metal pipe section.

Figure 5:
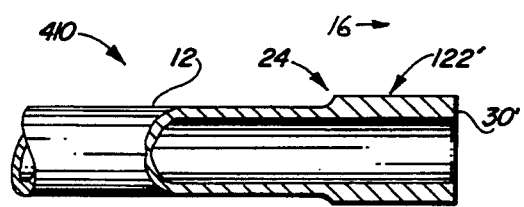
FIGS. 5, 6, and 7 are broken, part cross-sectional views of a pipe section that is in the process of being made into another embodiment of this invention.
Figure 6:
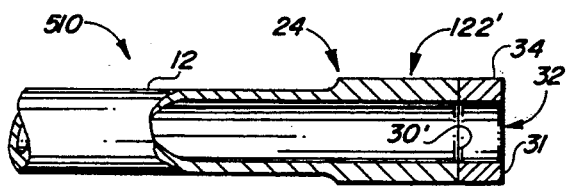
Figure 7:
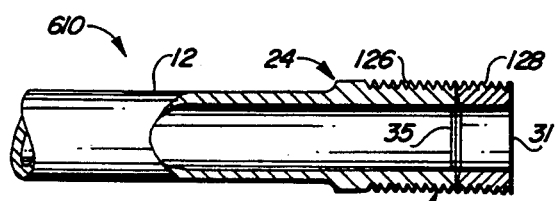

FIGS. 5, 6 and 7 set forth the details of another embodiment of the invention, wherein the pipe section 410 of FIG. 5 is new, and is received with no threads 122' at end 16 thereof.

In FIG. 6, an annular ring or short length of pipe 32 is axially aligned respective to the long length of pipe 12. The short length of pipe 32 being a material selected from the group consisting of alloys having greater resistance to corrosion respective to the long length of pipe 12. The short length of pipe 32 is butt welded onto end 30' of the remaining pipe as seen at numeral 35 to provide a hi-metallic pipe section 510 having a common axis 46.

Next, as seen in FIG. 7, new threads 126, 128 are formed on the outer surface 122' of the annular member 32 that forms part of the marginal ends of the bi-metallic pipe section 610, with the threads 126 and 128 being easy to match since they are uninterrupted and formed in a single operation along the entire end 122'.

EXAMPLE 1

The improved pipe section 310 is made by removing an annular ring at the threaded end 28 of a new or used pipe section 10 to provide a long length of pipe 12 having a cut end 30 opposed to an opposite end 16. As seen in FIG. 2, a new annular ring or short length of pipe 32 is axially aligned respective to the remaining long length of pipe 12, with the short length of pipe 32 being a material selected from the group consisting of alloys having greater resistance to corrosion respective to the long length of pipe 12. The short length of pipe 32 is butt welded onto the cut end 30 of the remaining pipe as seen at numeral 35 to provide a hi-metallic pipe section 210 having a common axis 46. Next, new threads 128 are formed on the outer surface of the attached annular member 32 that forms part of the ends of the bi-metallic pipe, with the old threads 26 and new threads 28 being matched to extend uninterrupted along the entire threaded end 22. Those skilled in the art comprehend how to index the new and old threads such that the layman has difficulty distinguishing the old and new threads from one another.

EXAMPLE 2

Often, when the pipe section 10 has been used previously, there will be several damaged threads located at the outermost marginal end 28 thereof which render the pipe section worthless for its intended use. The damaged end of the pipe section can be modified and made superior by removing the old damaged threads and replacing them with new threads 128 on the short length 32 of the bi-metallic pipe, wherein the resultant threaded end 22 of the pipe section 310 comprises an old threaded marginal length 26 integrally attached to a new threaded marginal end 128, in accordance with Example 1 of the method of this invention.

EXAMPLE 3

An improved pipe section 310 of FIG. 4 is made by selecting a new pipe section, which could have a configuration such as seen illustrated at 10 in FIG. 1, for example. The new pipe section has an annular marginal threaded end 22 that is reduced in length by removing part 28 as seen in FIG. 2. This provides a long length of pipe 12 having an end 30 and an opposed at end 16. An annular ring, or short length of substitute pipe 32, is axially aligned respective to the long length of pipe 12. The short length of pipe 32 being a material selected from the group consisting of alloys having greater resistance to corrosion respective to the long length of pipe 12.

The short length of pipe 32 is butt welded onto the cut end 30 of the remaining pipe as seen at numeral 35 to provide a bi-metallic pipe section 210 having a common axis 46. Next, new threads 128 are formed on the outer surface 34 of the new pipe section 310 that includes the annular member or substitute length of pipe 32 as well as the marginal ends at 26 of the pipe section 12. New threads 128 are formed in indexed relationship respective to the original new threads 26 to provide a new bi-metallic pipe section 310.

EXAMPLE 4

During the original manufacture of a pipe section 10, such as seen in FIG. 1, for example, the step of threading the opposed ends at 22, 22' is ommitted, thereby providing an unthreaded pipe section 410, such as seen, for example, in FIG. 5. The pipe section 410 therefore has opposed ends, as received, that are not threaded, contrary to what is usually carried out at the plant. Hence a new pipe section 410 having unthreaded ends at 122, 122' is provided that can be subsequently modified as set forth in FIGS. 6 and 7 to provide a new superior pipe section 610, as illustrated in FIG. 7. This is achieved by adding a ring or short length 32 which becomes part of the bi-metallic pipe, in accordance with this invention. Hence the threaded end 22 of the pipe section 610 comprises a new threaded length 126 integrally attached to a new threaded end 128, in accordance with the above method.

The pipe section 10, 310, and 610 can be processed according to this invention whereby either or both opposed ends are modified into the pipe section 310 of FIG. 4 and pipe section 610 of FIG. 7, in accordance with the teachings of this disclosure.

In the production of hydrocarbons, it would be desirable to be able to make a string of pipe entirely of stainless steel pipe sections and thereby avoid the deleterious effects of corrosive well fluids; however, this is not economically feasible for oil field pipe. The present invention provides a means by which ordinary pipe can be economically modified to provide a more superior product that resists the deleterious effects of corrosive well fluids and further enhances the use of plastic coating the interior of the pipe.

The present invention additionally provides a means by which damaged pipe can be reclaimed, and at the same time, a more superior product is realized by modifying the pipe section in accordance with this invention, then plastic coating the interior of the pipe in a known manner.

The relatively highly corrosion resistant member 32 preferably is stainless steel, such as 310 alloy, for example, and therefore it is unnecessary to rely on the usual plastic coating placed on the interior thereof in order for the pipe ends to withstand the deleterious effects of the corrosive well fluids encountered during the production of hydrocarbons. Therefore, when the pipe section 310 is set down on the threaded end thereof and the plastic coating near the terminal ends thereof is cracked and damaged, there is no need for concern because the exposed underlying stainless steel metal will not become corroded and fail prematurely due to its high resistance to corrosion. Accordingly, an ordinary pipe section 10, that has been modified according to this invention, can be plastic coated on the interior thereof to protect the relatively less corrosion resistant long length of pipe 12 thereof and thereby exhibit unusually good properties and long life just as if the entire pipe section were made of stainless steel.

Further, the present improved pipe section overcomes the usual problems encountered when making up the threaded coupling between pipe sections, where prior art pipe sections become gouged and the underlying metal thereby exposed to the corrosive fluids, whereupon premature failure usually occurs in the absence of the present invention.

I claim:

1. A method of making a bi-metal pipe section having at least one finished threaded marginal end, comprising the steps of:

step (1): removing at least one original threaded marginal end from a first pipe section to provide a long length of pipe having at least one intermediate threaded marginal end remaining at the end from which the at least one original marginal threaded end was removed;

step (2): axially aligning at least one annular short length of pipe with respect to said long length of pipe; selecting the at least one short length of pipe from a material selected from the group consisting of alloys having greater resistance to corrosion respective to the long length of pipe;

step (3): butt welding said at least one short length of pipe onto the at least one intermediate threaded end of the long length of pipe to provide a bi-metallic pipe section; and step (4): forming threads on said at least one short length of pipe extending along the at least one short length of pipe and continuing uninterrupted respective to threads formed on the at least one intermediate marginal threaded end.

2. The method of claim 1, wherein the first pipe section has threads on both original marginal ends thereof, and:

step (1) comprises removing both original marginal ends of the first pipe section;

step (2) comprises aligning a short length of pipe with each intermediate marginal threaded end of said long length of pipe;

step (3) comprises butt welding each short length of pipe onto a respective intermediate marginal threaded end of the long length of pipe to provide a bi-metallic pipe section; and step (4) comprises forming threads on each short length of pipe which are a continuation of the threads formed on each respective intermediate threaded marginal end.

3. The method of claim 2, wherein said first pipe section has damaged threads at the original threaded marginal ends thereof.

4. The method of claim 1, wherein said first pipe section has damaged threads at the at least one original threaded marginal end.

5. The method of claim 4, wherein the step of butt welding is performed from the interior of the axially aligned pipes.

6. The method of claim 1, wherein the step of butt welding is performed from the interior of the axially aligned pipes.

7. A method of improving the resistance to corrosion exhibited by a pipe section, wherein the pipe section has opposed ends, comprising the steps of:

step (1): selecting at least one annular body having a greater resistance to corrosion respective to the pipe section, said at least one annular body having a short length respective to the length of the pipe section;

step (2): butt welding said at least one annular body to at least one end of said pipe section in axially aligned relationship therewith; and step (3) forming threads on said at least one annular body that are a continuation of threads formed on said at least one end of the pipe section.

8. The method of claim 7, wherein said pipe section has threads formed on opposed marginal ends thereof; and further comprising the steps of removing a limited length from both opposed marginal ends, thereby forming an intermediate pipe section having opposed intermediate marginal threaded ends; butt welding an annular body to each opposed intermediate marginal threaded end; and forming threads on each said annular body which are a continuation of the threads formed on the respective opposed intermediate marginal threaded ends.

9. The method of claim 8, wherein the pipe section has damaged threads at at least one of the opposed marginal threaded ends, and wherein the removing step comprises removing the damaged threads before step (2) is carried out.

10. The method of claim 7, wherein the pipe section has damaged threads at the at least one end thereof, and further comprising removing the damaged threads before step (2) is carried out.

11. The method of claim 10, wherein the step of butt welding is performed from the interior of the axially aligned members.

12. The method of claim 7, wherein the step of butt welding is performed from the interior of the axially aligned members; and further comprising coating the interior of the pipe section with plastic.

13. A method of making a bi-metal pipe section, comprising the steps of:

step (1): selecting a pipe section having opposed ends;

step (2): selecting at least one annular body having greater resistance to corrosion respective to said pipe section, said at least one annular body having a short length respective to the length of said pipe section;

step (3): butt welding said at least one annular body to at least one end of said pipe section in axially aligned relationship therewith;

step (4): forming threads on said at least one end of said pipe section; and step (5): forming threads on said at least one annular body that are a continuation of the threads formed on said at least one end of the pipe section, thereby providing a bi-metal pipe section having at least one threaded marginal end that is more resistant to corrosion respective to the pipe section selected in step (1).

14. The method of claim 13, wherein threads are formed on both ends of said pipe section; step (3) comprises butt welding an annular body to each opposed threaded end; and step (5) comprises forming threads on each opposed annular body which are a continuation of the threads formed at each end of the pipe section.

* * * * *